(12) United States Patent
Reddiconto et al.

(10) Patent No.: US 10,284,089 B2
(45) Date of Patent: May 7, 2019

(54) INTEGRATED BI-DIRECTIONAL DRIVER WITH MODULATED SIGNALS

(71) Applicant: Apple Inc., Cupertino, CA (US)

(72) Inventors: Salvatore Reddiconto, San Jose, CA (US); Dong Yang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/452,411

(22) Filed: Mar. 7, 2017

(65) Prior Publication Data

US 2018/0091056 A1     Mar. 29, 2018

Related U.S. Application Data

(60) Provisional application No. 62/399,050, filed on Sep. 23, 2016.

(51) Int. Cl.
*H02M 3/155* (2006.01)
*H02M 3/158* (2006.01)
*H02M 1/14* (2006.01)

(52) U.S. Cl.
CPC .......... *H02M 3/1582* (2013.01); *H02M 1/14* (2013.01); *H02M 3/155* (2013.01)

(58) Field of Classification Search
CPC .......... H02M 7/42; H02M 7/48; H02M 7/487; H02M 7/493; H02M 7/501; H02M 7/4826; H02M 7/49; H02M 7/4807; H02M 7/537; H02M 7/5387; H02M 7/533; H02M 7/53; H02M 2001/0012; H02M 2001/0009; H02M 2003/1566; H02M 2003/1557; H02M 3/156; H02M 3/158; H02M 3/1588; H02M 3/155; H02M 3/1582; H02M 3/157; H02M 3/1563; H04B 2215/069
See application file for complete search history.

(56) References Cited

U.S. PATENT DOCUMENTS

2012/0299553 A1* 11/2012 Menegoli .............. H02J 7/0052
                                                                 320/140
2014/0084883 A1*  3/2014 Tanabe ................ H02M 3/1582
                                                                 323/271

\* cited by examiner

*Primary Examiner* — Bryan R Perez
(74) *Attorney, Agent, or Firm* — Blank Rome LLP

(57) ABSTRACT

According to some embodiments, a bi-directional converter is configured to operate in a boost mode or a buck mode. The bi-directional converter includes a hysteresis control unit that includes a comparator that can be configured to determine whether the reference voltage has a positive slope or a negative slope in conjunction with the bi-directional converter operating in boost mode or buck mode. In addition, the comparator is configured to compare a fractional load voltage to a reference voltage so that the output load voltage corresponds to the waveform shape of the reference voltage.

20 Claims, 7 Drawing Sheets

INTEGRATED BI-DIRECTIONAL DRIVER WITH MODULATED SIGNALS

CROSS-REFERENCE TO RELATED APPLICATIONS

The present application claims the benefit of U.S. Provisional Application No. 62/399,050, entitled "INTEGRATED BI-DIRECTIONAL DRIVER WITH MODULATED SIGNALS" filed Sep. 23, 2016, the content of which is incorporated herein by reference in its entirety for all purposes.

FIELD

The described embodiments are directed towards a bi-directional driver and techniques for controlling the bi-directional driver to operate in a boost mode and a buck mode.

BACKGROUND

Portable electronic devices may include an actuator requiring a high voltage in order to drive the actuator. Usually, the high voltage may be generated from a single cell battery having a low starting voltage. Conventional solutions to generate the high voltage from a low starting voltage may utilize a switching boost converter to generate a voltage rail at a level higher than a peak voltage to be supplied to the load. However, these conventional solutions can require high voltage capacitors to generate the necessary high voltage. For example, conventional switching boost converters may not be able to sustain the full amount of power required by the load over a prolonged period of time due to the small battery size of portable electronic devices. In addition, the energy that is provided to the load can be offset with a large amount of voltage drop. In order to efficiently drive the load for a prolonged period of time, power management circuits may need to include large capacitors and/or generate a large input current which can be impractical given the small form factor of many of the current portable electronic devices. Other conventional solutions include a class AB or class D amplifier to generate the necessary waveform. However, the energy stored by a capacitive load is often dissipated by the amplifier so that no energy recovery can be accomplished.

SUMMARY

This paper describes various embodiments related to a power management system including a bi-directional driver. Techniques for switching the bi-directional driver between a boost mode and a buck mode are described herein.

A bi-directional converter is provided herein including an inductor coupled to two switches. The bi-directional converter is positioned between a power supply and a load. The switches are in parallel with diodes. A first switch is in shunt configuration, and the second switch is in series between the inductor and a load. Control circuitry compares a reference signal with a sensed version of the output voltage on the load. Based on the comparison, pulse trains are sent in a bursty fashion to one or the other switch. In a boost mode, the first (configured as a shunt switch) switch allows current to flow through the inductor. When the first switch opens, the current flows through a diode, bypassing the second switch, and into the load, resulting in a boosted output voltage. In a buck mode, the second switch allows a current to flow from the load through the inductor to the power supply. In addition, when the second switch opens, the collapsing magnetic field in the inductor provides an additional current flow into the power supply through the diode bypassing the first switch.

Provided herein is a method for switching a bi-directional converter between a boost mode and a buck mode. The method includes receiving a fractional voltage of a load voltage, comparing the fractional voltage to a reference voltage, generating an output value based on the comparison, determining a slope of the reference voltage, and determining an operational mode based on the slope, wherein the operational mode is a boost mode when the slope is positive and otherwise the operational mode is a buck mode. The method provides a first control signal based on the output value to a first switch during the boost mode and provides a second control signal based on the output value to a second switch during the buck mode.

The described embodiments may be better understood by reference to the following description and the accompanying drawings. Additionally, advantages of the described embodiments may be better understood by reference to the following description and accompanying drawings.

BRIEF DESCRIPTION OF THE DRAWINGS

The disclosure will be readily understood by the following detailed description in conjunction with the accompanying drawings, wherein like reference numerals designate like structural elements, and in which.

Figure 1:
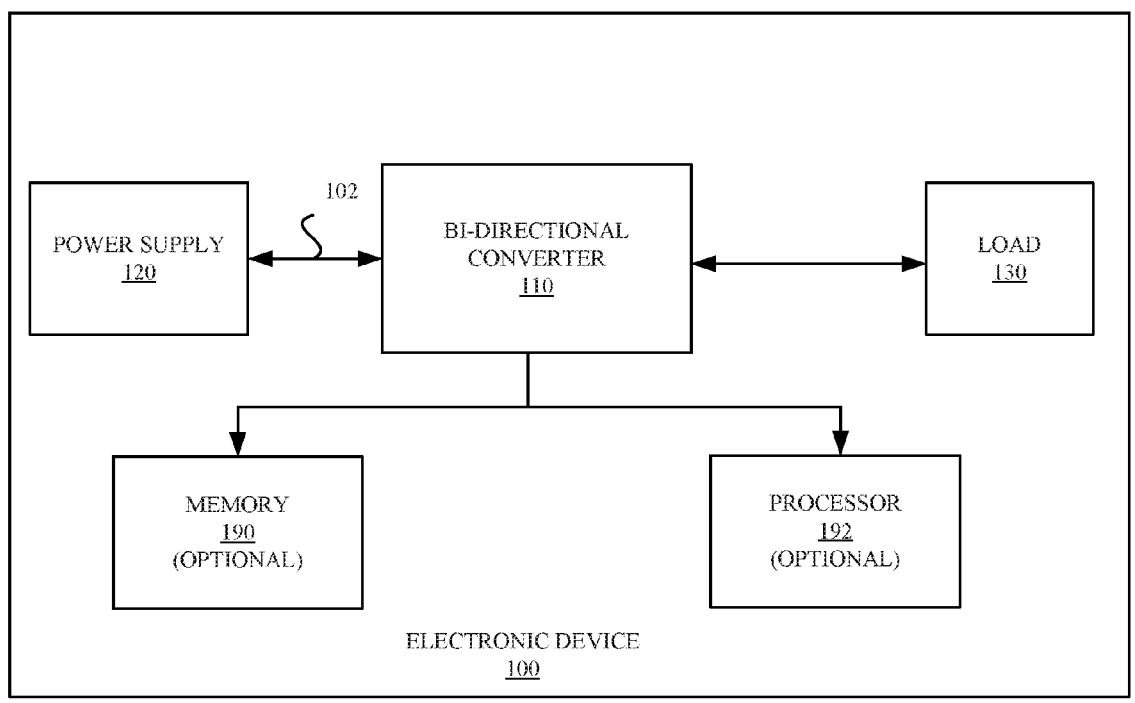
FIG. 1 illustrates an exemplary electronic device that includes a bi-directional converter, in accordance with some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

The following disclosure describes various embodiments of a bi-directional converter and techniques for operating the bi-directional converter. Certain details are set forth in the following description and figures to provide a thorough understanding of various embodiments of the present technology. Moreover, various features, structures, and/or characteristics of the present technology can be combined in other suitable structures and environments. In other instances, well-known structures, materials, operations, and/or systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

A bi-directional converter is set forth herein which includes a power management function. That is, the bi-directional converter boosts current originating at a source battery, where the boost current is needed to produce a high voltage at a load terminal. The bi-directional converter also recovers energy from the load to be restored to the battery, while satisfying load waveform requirements.

By combining the buck converter and boost converter into a bi-directional converter, the bi-directional converter significantly reduces the number of switching components. In this instance, excessive switching delays normally associated with a power management circuit having a separate buck converter and a separate boost converter operating in buck mode and boost mode are significantly reduced. In addition, the disclosed bi-directional converter is configured to deliver a boost current to a load during a boost mode and provide a charging current to the battery in a buck mode. In this way, the battery can efficiently recover energy that would otherwise be lost. By reducing the number of electronic components in the bi-directional converter, a reduced topology in terms of circuit board area is achieved. The bi-directional converter, which consumes little space, is useful in a portable electronic device.

The system and methods described herein can be used to perform power management functions for computers, portable electronic devices, wearable electronic devices, server devices, computer network storage devices, and general electronic devices, such as those manufactured by Apple Inc., based in Cupertino, Calif.

These and other embodiments are discussed below with reference to FIGS. 1-7. The detailed description given herein with respect to these figures is for explanatory purposes only and should not be construed as limiting. The numerical values used in this discussion are purely illustrative and are for purposes of examples only, and a wide range of values could be used in conjunction with the power management functions provided herein.

System

FIG. 1 illustrates a block diagram of an electronic device 100, in accordance with some embodiments. Electronic device 100 includes a bi-directional converter 110 that is coupled to a power supply (e.g., battery) 120. The bi-directional converter 110 can be configured to receive an input battery voltage from the power supply 120. In some embodiments, processor 192 controls the functions of the bi-directional converter 110. In some embodiments, logic internal to the bi-directional converter 110 controls the functions of the bi-directional converter 110. The functions of the components shown in FIG. 1 can be implemented by a combination of hardware and/or software. The electronic device 100 can optionally include one or more non-transitory computer-readable storage mediums or memory 190 for storing instructions related to executing the functions of the control logic that can be executed by one or more processors (e.g., processor 192). In some embodiments, the bi-directional converter 110 is electrically coupled to a load 130. In some examples, the load 130 is an electromechanical actuator, a piezoelectric actuator, a sensor, or the like.

The load 130 can be characterized as having a small capacitance value, e.g., between about 20 nF to about 300 nF. In some embodiments, the load 130 can be characterized as operating with an alternating current (A/C) signal with a frequency range between about 5 KHz to about 200 KHz. In some examples, the A/C signal of the voltage (i.e., load voltage) that is applied to the load 130 can be characterized as having a waveform that is sinusoidal, trapezoidal, and the like. In some embodiments, the waveform shape of the output load voltage/input load voltage corresponds to the waveform shape of the reference voltage.

The power supply 120 can refer to a rechargeable battery, such as a lithium-ion battery pack, nickel metal hydride battery pack, and the like. Lithium-ion batteries are widely used in portable electronic devices because of their high energy density, long cycle life and the absence of memory effects. In some examples, the battery can have a voltage between e.g., 3 V and 15 V (e.g., the battery pack may experience a range of voltages during operation). In some instances, the power supply 120 can refer to power adapters that provides an input battery voltage that is either less than the lowest battery pack voltage (e.g., 5 V when the battery voltage is between 6 V and 8.7 V) or greater than the highest battery pack voltage (e.g., 12 V or 15 V when the battery voltage is between 6 V and 8.7 V). For example, a range of the input battery voltage can be between e.g., 0.1 V to 20 V. More specifically, the range of the input battery voltage can be between, e.g., 5 V to 12 V.

In some embodiments, the components of the electronic device 100 can be electrically coupled by signal lines, links or buses 102. While electrical communication has been used as an illustrative example, in general these connections may include electrical, optical, or electro-optical communication of signals and/or data. Furthermore, in the preceding embodiments, some components are shown directly connected to one another, while others are shown connected via intermediate components. In each instance the method of interconnection, or 'coupling,' establishes some desired communication between two or more circuit nodes, or terminals. Such coupling may often be accomplished using a number of circuit configurations, as will be understood by those of skill in the art (e.g., AC coupling and/or DC coupling may be used).

In some embodiments, functionality of a bi-directional converter, components, and the electronic device can be implemented in one or more: application-specific integrated circuits (ASICs), field-programmable gate arrays (FPGAs), and/or one or more digital signal processors (DSPs). Moreover, the circuits and components may be implemented using any combination of analog and/or digital circuitry, including: bipolar, PMOS and/or NMOS gates or transistors. Furthermore, signals in these embodiments may include digital signals that have approximately discrete values and/ or analog signals that have continuous values. Additionally, components and circuits may be single-ended or differential, and power supplies may be unipolar or bipolar.

Bi-Directional Converter

Figure 2A:
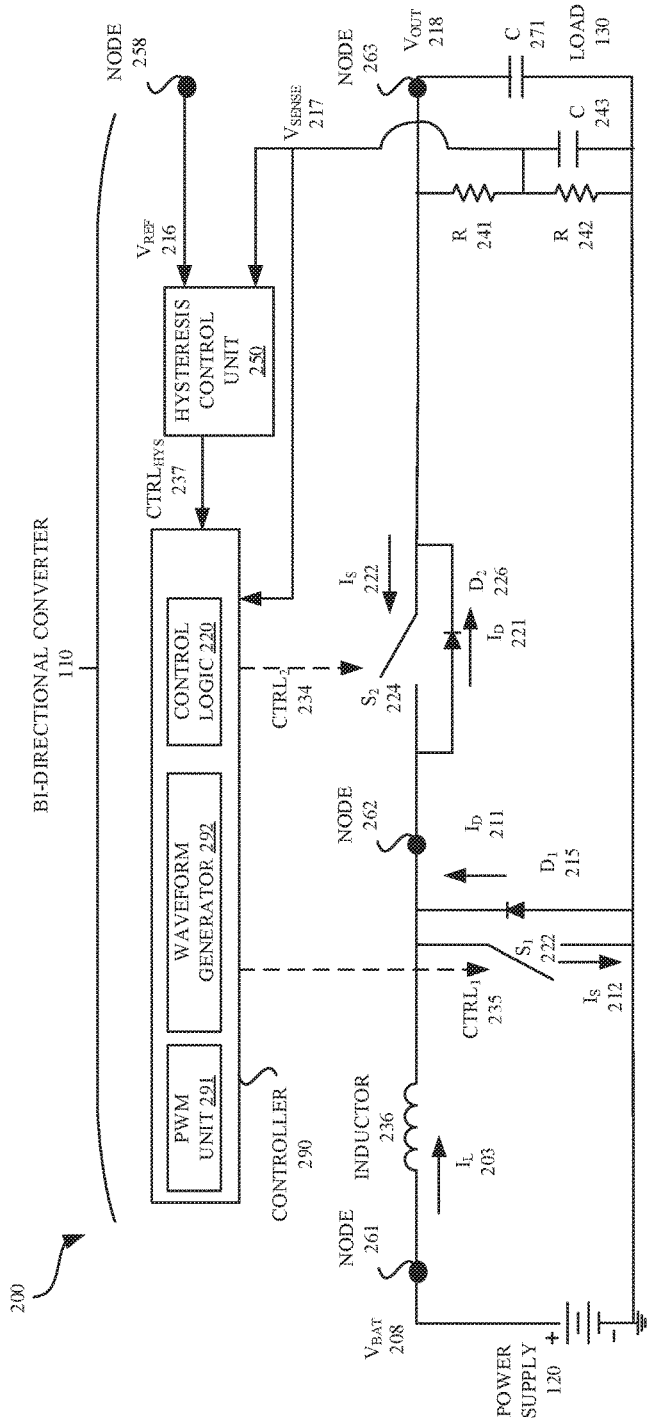
FIG. 2A illustrates a circuit diagram of a bi-directional converter configured to re-store energy to a power supply, e.g., a battery, using two switches, in accordance with some embodiments.

FIG. 2A illustrates exemplary details of the bi-directional converter 110, including identified currents and voltages useful for explaining operating modes, according to some embodiments. Details of a hysteresis control unit 250 are provided in FIG. 2B. An illustration of a resulting output waveform in a boost mode 281 and a buck mode 282 is provided in FIG. 2C.

As illustrated in FIG. 2A, an exemplary bi-directional converter 110 includes controller 290, the hysteresis control unit 250, a first switch $S_1$ 222, a second switch $S_2$ 224, and an inductor 236. The controller 290 includes control logic 220, a pulse width modulator (PWM) unit 291 and a waveform generator 292. The bi-directional converter 110 is coupled to the power supply 120 at a node 261 and to the load 130 at a node 263. The inductor 236 couples the node 261 to an internal node, node 262. The switch $S_1$ 222 couples the node 262 to ground and is in parallel with a diode $D_1$ 215 which is oriented with its anode terminal at ground. The switch $S_2$ 224 couples the node 263 to the node 262 and is in parallel with a diode $D_2$ 226 which is oriented with its anode terminal at the node 262. The load 130, in some embodiments, may be modelled as including a capacitor C 271. Generally, the load 130 may also be modelled as including a resistor in series with C 271 (not shown).

Hysteresis control unit 250 receives inputs of $V_{SENSE}$ 217 from a resistive divider that provides a fractional value ($V_{SENSE}$ 217) of load voltage, $V_{OUT}$ 218. The resistive divider is made up of R 241 and R 242. R 242 is in parallel with a capacitor C 243, in some embodiments. In some embodiments, resistor R 241, resistor R 242, and capacitor C 271 function as a voltage divider and a low pass filter between $V_{OUT}$ 218 and $V_{SENSE}$ 217. $V_{SENSE}$ 217 is the voltage at a node formed by terminals of R 241, R 242, and C 243. The other terminal of R 241 is at the node 263. The other terminal of R 242 is at ground.

As mentioned above, the bi-direction converter 110 includes a voltage divider (shown as R 241 and R 242) that is coupled to the load 130. The voltage divider output may be referred to herein as a fractional load voltage. In some examples, the fractional load voltage is an amplified version (1/divider_value) of the reference voltage that is established by the control logic 220.

In some examples, the voltage divider can be incorporated within the bi-directional converter 110. In other examples, the voltage divider can be external to the bi-directional converter 110 and the fractional voltage, $V_{SENSE}$ 217, is provided to the hysteresis control unit 250.

Figure 2C:
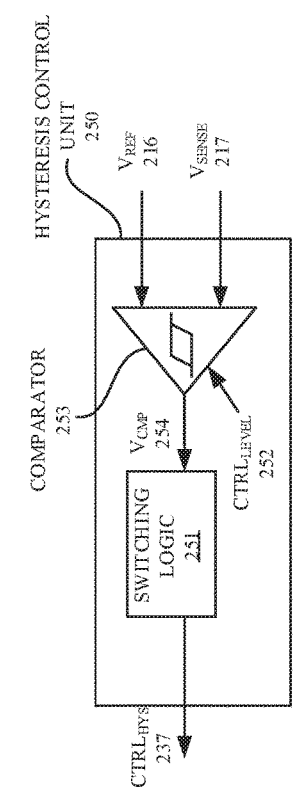
FIG. 2C illustrates an exemplary output voltage waveform and time intervals in which boost and buck modes are invoked by the circuit of FIG. 2A, according to some embodiments.
Figure 2B:
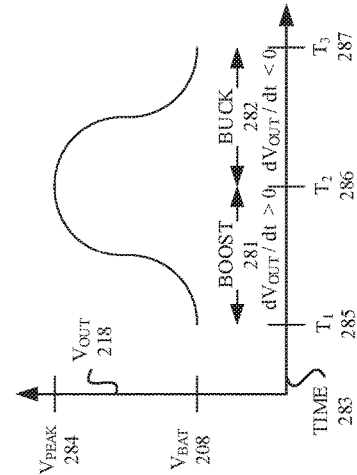
FIG. 2B illustrates an exemplary hysteresis control unit, according to some embodiments.

The hysteresis control unit 250, in some embodiments, includes a comparator 253 (see FIG. 2B). The comparator 253 receives as inputs the signal $V_{REF}$ 216 and the signal $V_{SENSE}$ 217. In some embodiments, the signal $V_{REF}$ 216 is provided by the waveform generator 292 (connection not shown in FIG. 2A). In some embodiments, $V_{REF}$ 216 is provided at an input to the bi-directional converter 110, denoted node 258 in FIG. 2A. The output of the control logic 220 includes signals $CTRL_1$ 235 and $CTRL_2$ 234. In some embodiments, $CTRL_1$ 235 and $CTRL_2$ 234 are output signals of the PWM unit 291. The hysteresis control unit 250 is configured to use the comparator 253 output, $V_{CMP}$ 254, to provide control signals indicated as $CTRL_{HYS}$ 237 to the control logic 220 to operate the bi-directional converter 110 in buck mode 282 when the slope (Δvoltage/Δtime) of the reference voltage is negative (slope ≤0) (see FIG. 2C). The comparator 253 exhibits hysteresis and the levels of hysteresis are configurable based on a control signal $CTRL_{LEVEL}$ 252 from the control logic 220. Control logic 220 and switching logic 251 are aware of $V_{REF}$ 216 and $V_{SENSE}$ 217. In some instances, switching logic 251 sets $CTRL_{HYS}$ 237 based on one or both of these. In this manner, the control logic 220 can be configured to generate the desired shape of the waveform of the output load voltage with an acceptable level of ripple.

FIG. 2C introduces an illustration of the waveform VOUT 218. VOUT 218 follows, by operation of the bi-directional converter 110, the reference waveform VREF 216, which is generally periodic. One period of VOUT 218 is illustrated in FIG. 2C. VOUT 218 generally includes some ripple; the ripple is not shown in FIG. 2C. The y-axis corresponds to the intensity of VOUT 218 and the x-axis corresponds to time, indicated as time 283. From a time T1 285 to a time T2 286, the slope of VOUT 218 is positive and the bi-directional converter 110 operates in the boost mode 281. From the time T2 286 to a time T3 287, the slope of VOUT 218 is zero or negative and the bi-directional converter 110 operates in the buck mode 282. VOUT 218 is lower-bounded by the value VBAT 208. VOUT 218 experiences a peak value indicated as VPEAK 284 which occurs at the time T2 286. In some examples, VOUT 218 has a range between, e.g., about 1 V to about 150 V. In some examples, the peak voltage VPEAK 284 is at least, e.g., 100 V. In some instances, the peak voltage VPEAK 284 is between, e.g., 100 V to 150 V.

The bi-directional converter 110 uses the current $I_L$ 203 through the inductor 236 to boost energy to the load 130 (boost mode 281) or take energy from the load 130 (buck mode 282) so that the waveform $V_{OUT}$ 218 imitates the shape (other than amplitude scaling) of the waveform $V_{REF}$ 216 within acceptable limits.

The comparator 253 is a central piece in influencing $V_{OUT}$ 218 to follow $V_{REF}$ 216. The comparator 253 can be configured to compare $V_{SENSE}$ 217 to $V_{REF}$ 216 to determine the intermediate value $V_{CMP}$ 254. In some examples, the reference voltage waveform $V_{REF}$ 216 can be established by the control logic 220, as mentioned above. Based on the comparison between the fractional load voltage, $V_{SENSE}$ 217, and the reference voltage $V_{REF}$ 216, the comparator 253 can generate the intermediate value $V_{CMP}$ 254. The signal $CTRL_{HYS}$ 237 from the switching logic 251 to the control logic 220 depends on whether the bi-directional converter 110 is in boost mode 281 or buck mode 282 and depends on the intermediate value $V_{CMP}$ 254. The control logic 220 can then cause the PWM unit 291 to emit one or more control signals, e.g., $CTRL_1$ 235 and $CTRL_2$ 234, which are then applied in the bi-directional converter 110 to the switches $S_1$ 222 and $S_2$ 224. Depending on which of the one or more control signals e.g., $CTRL_1$ 235 and $CTRL_2$ 234, are asserted, the bi-directional converter will operate in boost mode 281 or buck mode 282 with $V_{OUT}$ 218 following $V_{REF}$ 216. Opportunistic energy recovery to the power supply 120 can occur during buck mode 282.

The control logic 220 can be configured to change the type of control signals that are provided by the PWM unit 291 depending on whether the bi-directional converter 110 is operating in boost mode 281 or buck mode 282. For example, the control signals generated by the control logic 220 can be based on intermediate value $V_{CMP}$ 254 and the slope of $V_{OUT}$ 218 or of $V_{REF}$ 216. Slope refers to a change in voltage with time, e.g., Δvoltage/Δtime. The control logic 220 is configured to adjust the duty cycle of the waveform of the electrical pulses generated by the PWM unit 291, as described in greater detail with reference to FIG. 6A. The PWM unit 291 can be configured to adjust the current that is provided to the load 130 by switching between a low period and a high period of a pulse duty cycle. In some embodiments, the PWM unit 291 can adjust the duty cycle of the control signals generated in conjunction with boost mode and buck mode to define a minimum and maximum pulse duty cycle. The PWM unit 291 adjusts the duty cycle of the control signals so that the $V_{OUT}$ 218 waveform shape corresponds to the $V_{REF}$ 216 waveform shape.

In some embodiments, the hysteresis control unit 250 can be configured to regulate the toggling, or switching activity, of the switches $S_1$ 222 and $S_2$ 224 to cause the $V_{OUT}$ 218 waveform to correspond to the $V_{REF}$ 216 waveform shape. Sending a train of pulses from the PWM unit 291 to a switch is referred to herein as active switching. Holding a control line at logic low level is referred to herein as an un-asserted control state. The hysteresis control unit 250 can be configured to control an amount of voltage ripple as the bi-directional converter 110 operates in either boost mode 281 or buck mode 282, independent of a load capacitance, reference waveform shape, and/or reference waveform frequency.

In some embodiments, the waveform generator 292 can be configured to generate the shape of the waveform of the reference voltage $V_{REF}$ 216 and thus of the load output voltage $V_{OUT}$ 218 (other than, for example, ripple). Exemplary shapes include a sinusoidal or trapezoidal waveform shape.

In some examples, the electronic device 100 can refer to a tablet computer, a smartphone, a touch-sensitive device, a stylus, an electronic accessory, a portable computer, a smart watch, a consumer-electronic device, a digital organizer, a cellular phone, a network appliance, a server.

FIG. 2A, described above, illustrates exemplary power management functions of an electronic device, in accordance with some embodiments. The power management functions are provided by the bi-directional converter 110. In some embodiments, a bi-directional converter 110 can include any number of switches, e.g., four switches. In some examples, the bi-directional converter 110 may be referred to as a buck-boost circuit. In some examples, a bi-directional converter 110 can be characterized as a DC-to-DC converter. As described above, the bi-directional converter 110 can include control logic 220, where the control logic 220 is configured to generate one or more control signals to toggle or adjust the switches $S_1$ 222 and $S_2$ 224 to operate the bi-directional converter 110 in boost mode 281 or buck mode 282. In some examples, the control logic 220 can be configured to cause the bi-directional converter 110 to operate in a charge configuration (i.e., boost) to generate an input current from the power supply 120 to cause an output load voltage at the load 130. Then, the control logic 220 can cause the bi-directional converter 110 to operate in a load discharge configuration (i.e., buck) to step down a load voltage from the load 130, treated now as an input energy source to the bi-directional converter 110, to generate a current to supply energy to a power supply 120, treated now as an output load.

A bi-directional converter 110 can be configured to receive an input battery voltage at a node 261 from a power supply 120. In some examples, the power supply 120 can refer to a battery that is located within a device external to the electronic device. A bi-directional converter 110 can be electrically coupled to a load 130 at node 263. Although FIG. 2A shows that the load 130 is modelled as a capacitor C 271, the load 130 can also refer to an electronic component such as a piezoelectric actuator, an electromechanical actuator, and the like. In another example, the load can be modeled as a capacitor (e.g., capacitor C 271) in series with a resistor.

The term "reference voltage" can be used interchangeably with the term "reference signal." In some examples, reference voltage $V_{REF}$ 216 can have a peak value between e.g., 0.5 V to 0.6 V. In some embodiments, reference voltage $V_{REF}$ 216 can have a peak-to-peak range of e.g., 1 V.

In conjunction with the bi-directional converter 110 operating in boost mode 281, the comparator 244 can be configured to determine whether to toggle switch $S_1$ 222 (asserted) with a series of pulses from the PWM unit 291 (actively switching) or leave switch $S_1$ 222 in an open configuration (un-asserted) by comparing $V_{SENSE}$ 217 to the reference voltage $V_{REF}$ 216. In some examples, the comparator 253 and switching logic 251 can generate a first output value (e.g., $CTRL_{HYS}$ 237=0, corresponding to an un-asserted switch control) if $V_{SENSE}$ 217 in comparison with $V_{REF}$ 216 does not satisfy a switching threshold value. In some examples, the comparator 253 and switching logic 251 can generate a second output value (e.g., $CTRL_{HYS}$ 237=1 corresponding to active switching) if $V_{SENSE}$ 217 satisfies the switching threshold value.

In conjunction with switch $S_1$ 222 in an active switching configuration that corresponds to, e.g., $CTRL_{HYS}$=1, the bi-directional converter 110 can be configured to provide energy to sustain a high output load voltage. In some embodiments, the hysteresis control unit 250 introduces a hysteresis amount to avoid excessive repeated pulses of current through the inductor 236. Excessive repeated pulses of current would follow based on rapid switching of $S_1$ 222. By applying hysteresis, $V_{OUT}$ 218 follows $V_{REF}$ 216 with some ripple and without excessive switching of $S_1$ 222 and $S_2$ 224. Examples of $CTRL_{HYS}$ 237 and pulse trains on $CTRL_1$ 235 and $CTRL_2$ 234 and resulting ripple are provided in FIG. 3. These examples are provided both for boost mode 281 and buck mode 282.

The hysteresis control unit 250 can be configured to allow a moderate amount of ripple while avoiding excessive switching as the bi-directional converter 110 operates in boost mode 281 or buck mode 282, independent of a load capacitance, waveform shape, and/or waveform frequency. By implementing an amount of hysteresis that depends on position within a period of $V_{REF}$ 216, the hysteresis control unit 250 can establish a low voltage transition point and a high voltage transition point that expands beyond the edges of the instantaneous value in time of $V_{REF}$ 216. In some embodiments, the hysteresis control logic 220 can introduce a positive hysteresis amount (HYSTP) and a negative hysteresis amount (HYSTN).

Figure 6A:
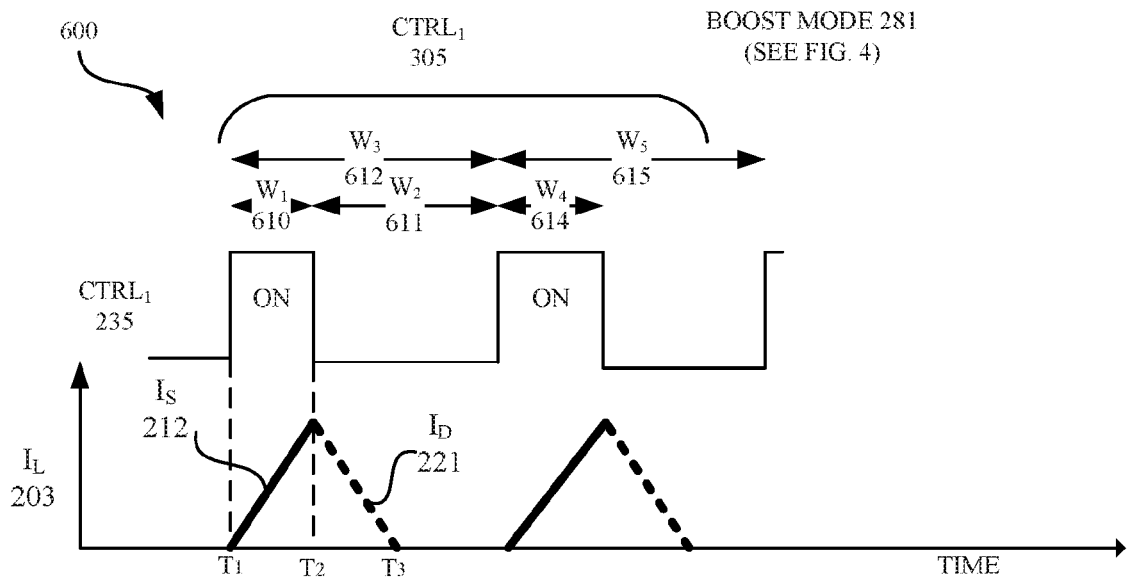
FIG. 6A illustrates exemplary components of the inductor current of FIG. 2A in relation to a switching waveform applied to the first switch in accordance with FIG. 4 (boost mode), according to some embodiments.
Figure 6B:
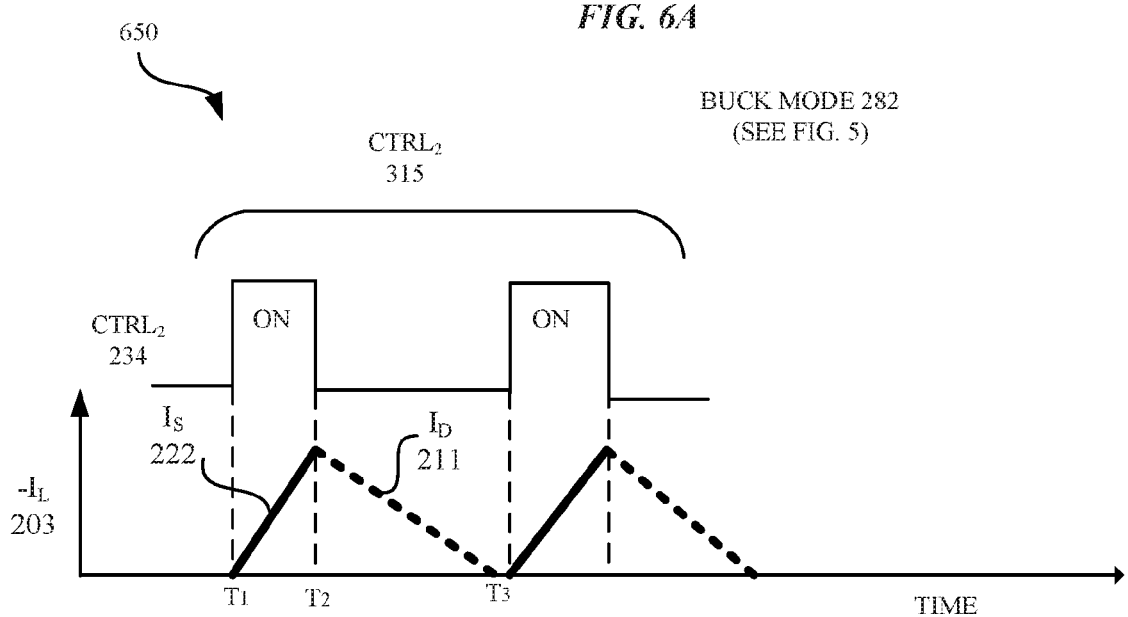
FIG. 6B illustrates exemplary components of the inductor current of FIG. 2A in relation to a switching waveform applied to the second switch in accordance with FIG. 5 (buck mode), according to some embodiments.

In some embodiments, the PWM unit 291 can be configured to vary the amount of current ($I_L$ 203) that is provided to the load 130 by switching between a low period and a high period of a pulse duty cycle (see FIGS. 6A and 6B for example pulses and currents). In some embodiments, the PWM unit 291 can adjust the duty cycle of the control signals generated in conjunction with boost mode 281 and buck mode 282 to define a minimum and maximum pulse duty cycle so that the shape of the waveform of the load voltage tracks, but does not jump far from, the shape of the waveform of the reference voltage shape. For example, if a fixed wide pulse width to the switch $S_1$ 222 were used, at high values of $V_{REF}$ 216, the resulting current would allow $V_{OUT}$ 218 to keep up with $V_{REF}$ 216. However, at low values of $V_{REF}$ 216, the resulting current would cause $V_{OUT}$ 218 (as represented by $V_{SENSE}$ 217) to surge far above $V_{REF}$ 216. By controlling pulse width as a function of position with a period of $V_{REF}$ 216, $V_{OUT}$ 218 (as represented by $V_{SENSE}$ 217) can be made to track $V_{REF}$ 216 with acceptable ripple. In some examples, the waveform shape of $V_{REF}$ 216, and thus $V_{OUT}$ 218, can be sinusoidal or trapezoidal.

Output Waveform Illustration, Boost and Buck Modes

Figure 3:
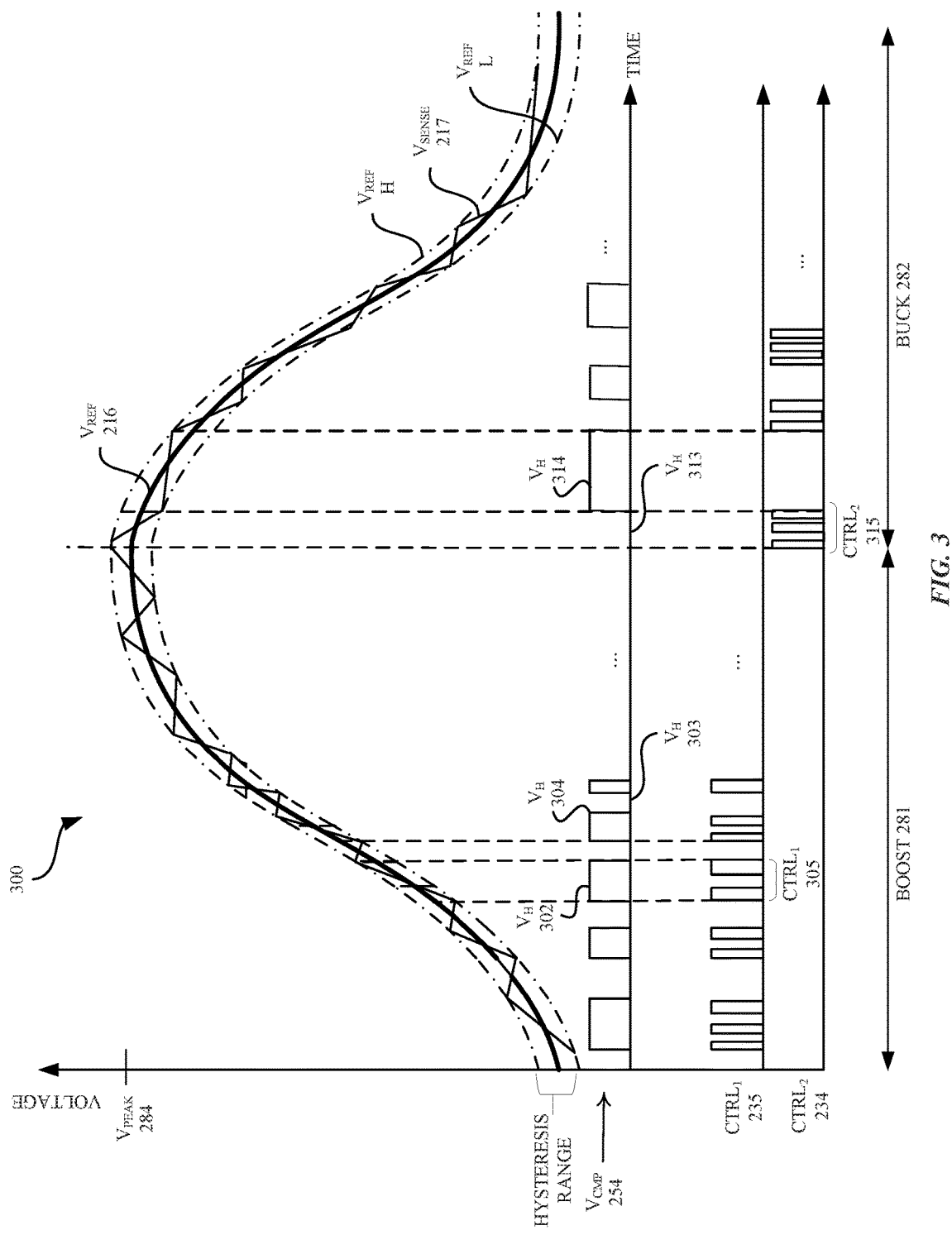
FIG. 3 illustrates exemplary relationships between a reference waveform and an output waveform produced based on operation of the bi-directional converter, where the output waveform is represented by a sense waveform, in accordance with some embodiments.

FIG. 3 illustrates a timing diagram of a modulated waveform of a bi-directional converter 110, while operating in conjunction with the boost mode 281 and the buck mode 282, in accordance with some embodiments. The pulse duty cycle and pulse width of the control signals $CTRL_1$ 235 and $CTRL_2$ 234 can be regulated by the PWM unit 291. In some embodiments, the control logic 220 can be configured to adjust the control signals provided to the PWM unit 291 to adjust the pulse duty cycle. The PWM unit 291 can be configured to regulate an amount of the switching frequency of the switches $S_1$ 222 and $S_2$ 224. The term "pulse duty cycle" refers to a pulse train, and the fraction of time in the pulse train that a control signal is asserted. The term "pulse width" can refer to a measure of an actual time that an electrical signal associated with the switch is "on" as measured in milliseconds, nanoseconds, and the like. In some examples, the switching frequency of the switches $S_1$ 222 and $S_2$ 224 is higher than the frequency of the output load voltage waveform, $V_{OUT}$ 218, in order to reduce voltage ripple and generate the cleanest possible spectrum of an output signal. The piece-wise evolution of the $V_{SENSE}$ 217 waveform in FIG. 3 is provided as a schematic view, and does not represent the underlying current pulses in FIGS. 6A and 6B in a scaled fashion.

Additionally, FIG. 3 shows that a shape of the waveform of the output load voltage $V_{OUT}$ 218 substantially corresponds to the shape of the waveform of the reference voltage $V_{REF}$ 216, which is shown as having a sinusoidal waveform shape. The waveform of the output load voltage follows $V_{REF}$ 216, and $V_{REF}$ 216 is generated by the waveform generator 292.

FIG. 3 shows a hysteresis range is introduced by the hysteresis control unit 250 so as to introduce positive and negative hysteresis amounts to cause switching to occur at a high voltage transition point ($V_{REF}$ H) and at a low voltage transition point ($V_{REF}$ L) instead of at the reference voltage ($V_{REF}$ 216). The high voltage transition point ($V_{REF}$ H) and the low voltage transition point ($V_{REF}$ L) represent the switching points for the comparator 253. For example, where the reference voltage is 1 V, the comparator 253 can be configured, via $CTRL_{LEVEL}$ 252, to establish a high voltage transition point of 1.1 V and a low voltage transition point of 0.9 V. In boost mode 281, switch $S_1$ 222 initiates active switching or toggling when $V_{SENSE}$ 217 falls below $V_{REF}$L and continues active switching until $V_{SENSE}$ 217 exceeds $V_{REF}$ H. Once $V_{SENSE}$ 217 exceeds $V_{REF}$ H, switch $S_1$ 222 will become un-asserted or open and the energy consumed by the load 130 will cause the $V_{OUT}$ 218 and $V_{SENSE}$ 217 to decease until $V_{SENSE}$ once again falls below $V_{REF}$L. In buck mode 282, switch $S_2$ 224 initiates active switching or toggling when $V_{SENSE}$ 217 is above $V_{REF}$H and continues active switching (thus generating current $I_L$ 203 to the power supply 120) until $V_{SENSE}$ 217 falls below $V_{REF}$ L (due to the energy consumed by load 130). As an example, the hysteresis range shown in FIG. 3 may be 100 mV to 200 mV when the peak to peak voltage of $V_{REF}$ 216 is 1 V.

FIG. 3 shows that the boost mode 281 corresponds to $V_{REF}$ 216 and $V_{OUT}$ 218 having a positive slope and the buck mode 282 corresponds to $V_{REF}$ 216 and $V_{OUT}$ 218 having a negative or zero slope. $V_{SENSE}$ 217 in FIG. 3 is somewhat idealized. Some variation in $V_{SENSE}$ 218 occurs with every pulse on $CTRL_1$ 235 or $CTRL_2$ 234 as explained with respect to FIGS. 4, 5, 6A, and 6B.

In some embodiments, the PWM unit 291 can continually adjust the pulse duty cycle associated with generating the output load voltage and control the amount of voltage ripple at the load 130. In some examples, an acceptable voltage ripple amount range is e.g., 3%-5% of the total peak voltage. In some embodiments, it may be desirable to have a continually adjusting pulse duty cycle in order to accommodate for a wide range between the low and high voltage transition points.

A group of $CTRL_1$ 235 pulses during boost mode 281 is marked as $CTRL_1$ 305. These occur during a positive comparator value $V_{CMP}$ 254 signal in an instance denoted $V_H$ 302. The pulses $CTRL_1$ 235 are actively switching $S_1$ 222 so that $V_{OUT}$ 218 (represented as $V_{SENSE}$ 217) will catch up and exceed $V_{REF}$ 216 to reach $V_{REF}$H. After $V_{REF}$ 216 exceeds $V_{REF}$H, $V_{CMP}$ 254 becomes un-asserted (denoted $V_H$ 303) and the pulse train stops. When $V_{SENSE}$ 217 falls below $V_{REF}$L, $V_{CMP}$ 254 becomes asserted (an instance denoted as $V_H$ 304), the pulse train resumes and thus active switching of $S_1$ 222 resumes.

A group of $CTRL_2$ 234 pulses during buck mode 282 is marked as $CTRL_2$ 315. These occur during un-assertion of the comparator $V_{CMP}$ 254 signal in an instance denoted $V_H$ 313. Correspondingly, the switching logic 251 will assert $CTRL_{HYS}$ 237 and the pulses $CTRL_2$ 235 are thus shown actively switching $S_2$ 224 so that $V_{OUT}$ 218 (represented as $V_{SENSE}$ 217) will decline below $V_{REF}$ 216 to reach $V_{REF}$L. During this time, current pulses are flowing into the power supply 120 taking energy from the load 130. After $V_{REF}$ 216 falls below $V_{REF}$L, $V_{CMP}$ 254 becomes asserted (denoted $V_H$ 314) and the pulse train stops. When $V_{SENSE}$ 217 exceeds $V_{REF}$H, $V_{CMP}$ 254 becomes un-asserted and active switching of $S_2$ 224 resumes.

Circuit Diagrams

Figure 4:
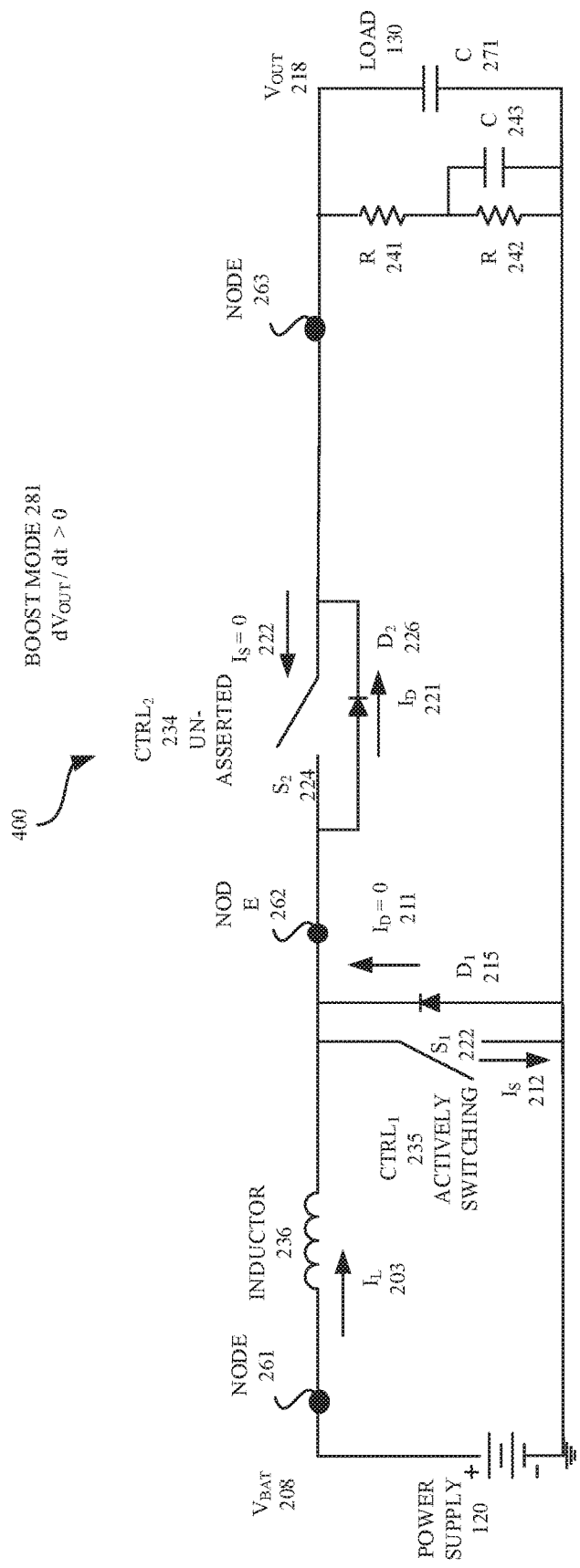
FIG. 4 illustrates states of the two switches and circuit currents during operation of the circuit of FIG. 2A in boost mode, according to some embodiments.
Figure 5:
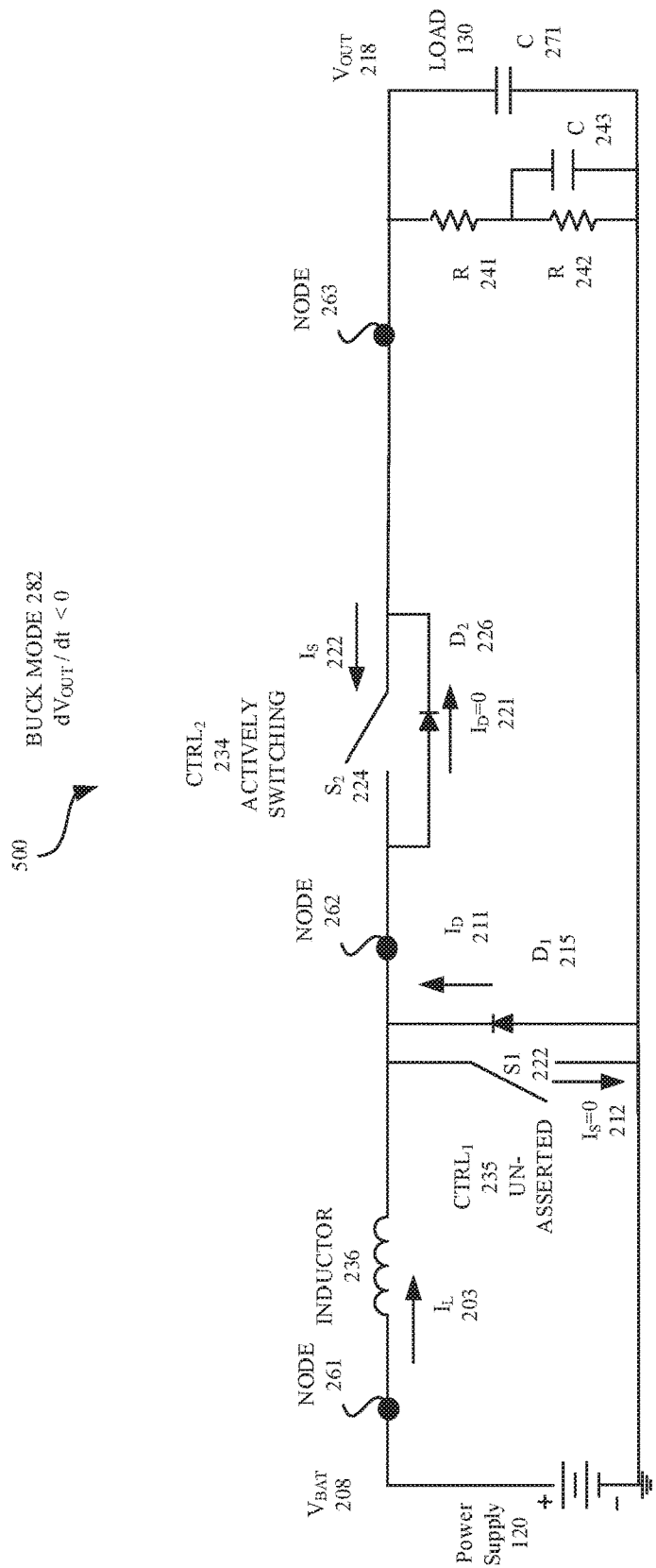
FIG. 5 illustrates states of the two switches and circuit currents during operation of the circuit of FIG. 2A in buck mode, according to some embodiments.

FIGS. 4-5 illustrate circuit diagrams of the bi-directional converter 110 operating in the boost mode 281 and the buck 282 mode, respectively, in accordance with some embodiments. In some embodiments, the hysteresis control unit 250 can be configured to introduce a negative and positive hysteresis amount to establish low and high transition points for operating a bi-directional converter 110 in boost mode 281 and similarly in buck mode 282. In general, the hysteresis may be asymmetric. That is, $V_{REF}$ H=$V_{REF}$ 216+$V_1$ while $V_{REF}$L=$V_{REF}$ 216−$V_2$, where $V_1$ is not equal to $V_2$. The hysteresis values $V_1$ and $V_2$ may be on the order of 50 mV when $V_{REF}$ 216 has a peak value of 1 V. The hysteresis control unit 250 is configured to continually adjust the hysteresis amount, in accordance with some embodiments. For instance, when a bi-directional converter 110 switches from buck mode 282 to boost mode 281, the control logic 220 can drive the signal $CTRL_{LEVEL}$ 252 to the hysteresis control unit 250 to adjust a resistor value in the comparator 253, e.g., and thus change $V_1$ and/or $V_2$ from 50 mV to 80 mV. By continually adjusting the hysteresis amount, the hysteresis control unit 250 can reduce voltage ripple. Voltage ripple is exemplified, for example, by the waviness or oscillation of the waveform $V_{SENSE}$ 217 around the waveform $V_{REF}$ 216 visible in FIG. 3.

FIG. 4 illustrates an exemplary configuration 400 of the bi-directional converter 110 in boost mode 281. The bi-directional converter 110 is configured to initiate toggling switch $S_1$ 222 to a pulsating or active switching configuration when $V_{SENSE}$ 217<$V_{REF}$ L, and stop active switching of switch $S_1$ 222 when $V_{SENSE}$ 217≥$V_{REF}$ H. Switch $S_2$ 224 is configured in an open condition in boost mode 281 and thus CTRL$_2$ 234 is un-asserted. Based on switch S$_1$ 222 closing during a pulse of CTRL$_1$ 235, I$_S$ 212 ramps up as current flows through the inductor 236 to ground (see FIG. 6A) and a magnetic field builds up in inductor 236. When the pulse ends, I$_S$ 212 changes quickly to zero, but the current I$_L$ 203 continues to flow through the inductor 236, by the circuit behavior of inductors. I$_D$ 221 then begins to flow (solving the summation of currents equation at the node 262) and flows into the load 130 represented by C 271 while the magnetic field in the inductor 236 collapses. V$_{OUT}$ 218 then begins to rise, based on integration in a calculus sense, of the current I$_D$ 221 in the C 271. After the magnetic field has collapsed in the inductor 236, V$_{OUT}$ 218 undergoes little change. The next time a pulse occurs on CTRL$_1$ 235, the current I$_S$ 212 again ramps up while the magnetic field builds in the inductor 236. When the pulse ends, the magnetic field drives I$_L$ 203 and thus the current I$_D$ 221 and V$_{OUT}$ 218 is again boosted by accumulation of charge on C 271.

FIG. 5 illustrates an exemplary configuration 500 of the bi-directional converter 110 in buck mode 282. The bi-directional converter 110 is configured to initiate toggling switch S2 224 to a pulsating or active switching configuration when VSENSE 217>VREF H, and stop active switching of switch S2 224 when VSENSE 217≤VREF L. Switch S1 222 is configured in an open condition in buck mode 282 and thus CTRL1 235 is un-asserted. Buck mode 282 is not a simple dual of boost mode 281 because the bursts of active switching of S2 224 are conditioned on what is effectively the input to the circuit charging the power supply 120 at this time. When a pulse arrives on CTRL2 234, IS 222 flows through the inductor 236 as IL 203 and into the power supply 120, this is energy recovery from the load 130. The sense of direction of IL 203 indicates a negative current at this time, flowing into the power supply 120. At this time, D1 215 is back-biased (or reverse biased) and does not turn on. While this flow into power supply 120 is occurring, a magnetic field is building up in the windings of the inductor 236. When the pulse of CTRL2 234 ends and S2 224 opens, a second recharging current flows as ID 211 (solving the current equation at the node 262) into the power supply 120, driven by the collapsing magnetic field in the windings of the inductor 236. D2 226 is back-biased and does not turn on. Thus, during the buck mode 282, two current pulses flow into the power supply 120, one based on IS 222 and the other based on collapse of the magnetic field in the windings of the inductor 236 when S2 224 opens.

Current Waveforms

FIGS. 6A and 6B give further details of the pulse train instances CTRL1 305 and CTRL2 315 introduced in FIG. 3. FIG. 6A includes y-axis IL 203 and an x-axis of time. Pulses CTRL1 305 are shown annotated "ON," referring to the switch S1 222 being closed. Current flows through the inductor 236 and to ground as IS 212 and is denoted with a bold line on FIG. 6A. The current waveform is shown somewhat idealized. If the voltage across the inductor 236 is a constant, then the current waveform will be a ramp, that is, a signal proportional to time. The duration of the pulse is shown as w1 610. The switch is then opened for a time w2 611. The sum of these times is w3 (reference numeral 612)=w1+w2. The duty cycle is w1/w3. When the switch opens, during the interval of width w2, IS 212 must become zero. The magnetic field built up in the windings of the inductor 236 during the time the switch was closed now forces IL 203 through D2 226 as the current ID 221 (shown as heavy dashed line). This current boosts the voltage on the load 130 modelled as C 271. The boost occurs because ID 221 causes charge to accumulate on C 271, and the behavior of a capacitor is such that it integrates, in a calculus sense, current. When the magnetic field has collapsed, the current IL 203 drops to zero until the next pulse arrives, shown with a duration w4 (reference numeral 614). Based on the level of VREF 216 or VOUT 218, the control logic 220 may cause the PWM unit 291 to create a duration w4 and period w5 (reference numeral 615) which are different from w1 and w3.

With further regard to FIG. 6A, switch S1 closes at T1 and IL 203 ramps up. Switch S1 222 opens at T2. In non-synchronous mode (shown in FIG. 4), IL decays through diode D2 226 as a function of time. In an alternative embodiment referred to herein as synchronous mode (not shown in FIG. 6A), switch S2 224 closes after switch S1 222 opens and IL 203 flows through closed switch S2 224 instead of through diode D2 226. Closing switch S2 224 in combination with the opening of switch S1 222 may be referred to herein as synchronous mode. FIG. 6A does not show this alternative activity on switch S2 224 carried out by CTRL2 234. A small gap in time exists between the opening of switch S1 222 and the closing of switch S2 224 so that node 263 is not shorted to ground. Synchronous mode in a switched circuit is also discussed in application Ser. No. 15/421,199 entitle "CHARGER-CONVERTER WITH SINGLE INDUCTOR AND DOWNSTREAM LOW-DROPOUT REGULATOR" filed on Jan. 31, 2017, which is hereby incorporated by reference. Application Ser. No. 15/421,199 and this application are assigned to the same assignee.

FIG. 6B illustrates two currents, I$_S$ 222 and I$_D$ 211 both of which are buck currents and transfer energy from the load 130 back to the power supply 120. The sign on I$_L$ 203 is (-) to indicate flow towards the power supply 120. Buck mode 282, exemplified by the CTRL$_2$ 315 group of pulses, controls the pulse train causing currents to flow toward the power supply 120 acting as an output load. Meanwhile the load 130 is being used as a source or input. However, the control of the bi-directional converter 110 is at the node 262 being used as an input. During the first pulse of CTRL$_2$ 315, denoted "ON," switch S$_2$ 224 closes and switch S$_1$ 222 is statically open, as discussed with respect to FIG. 5. The current I$_S$ 222 builds up (shown as a heavy line) and the magnetic field in the inductor 236 builds up. The current I$_S$ 222 is equal to the current IL 203 (based on solving the current equation at the node 262 and neglecting sense of direction), and flows into the power supply 120. When the pulse ends, the switch S$_2$ 224 opens and the inductor 236 forces current I$_D$ 211 through D$_1$ 215. This current also flows into the power supply 120, until the magnetic field in the inductor 236 has collapsed.

Thus, by means of the bi-directional converter 110, a circuit with low circuit board area, little heat dissipation, moderate switching activity, and controlled ripple drives a load and periodically recovers energy for a power supply 120 (e.g., a battery) while the output voltage follows a reference voltage and produces the desired effect at the load 130.

FIG. 6B illustrates a non-synchronous mode in which switch S$_1$ 222 is open and, when switch S$_2$ 224 opens at T$_2$, inductor current flows through diode D$_1$ 215. In order to provide an alternative path for the inductor current I$_L$ 203, a synchronous mode (not shown in FIG. 6B) can be used similar to that described with regard to FIG. 6A. For synchronous mode in FIG. 6B, after switch S$_2$ 224 opens at T$_2$, switch S$_1$ 222 closes until T$_3$ in order to provide an alternative path for the inductor current I$_L$ 203. FIG. 6B does not show this alternative activity on switch S$_1$ 222 carried out by CNRL₁ 235. A small gap in time exists between the opening of switch S₂ 224 and the closing of switch S₁ 222 so that node 263 is not shorted to ground.

Logic

Figure 7:
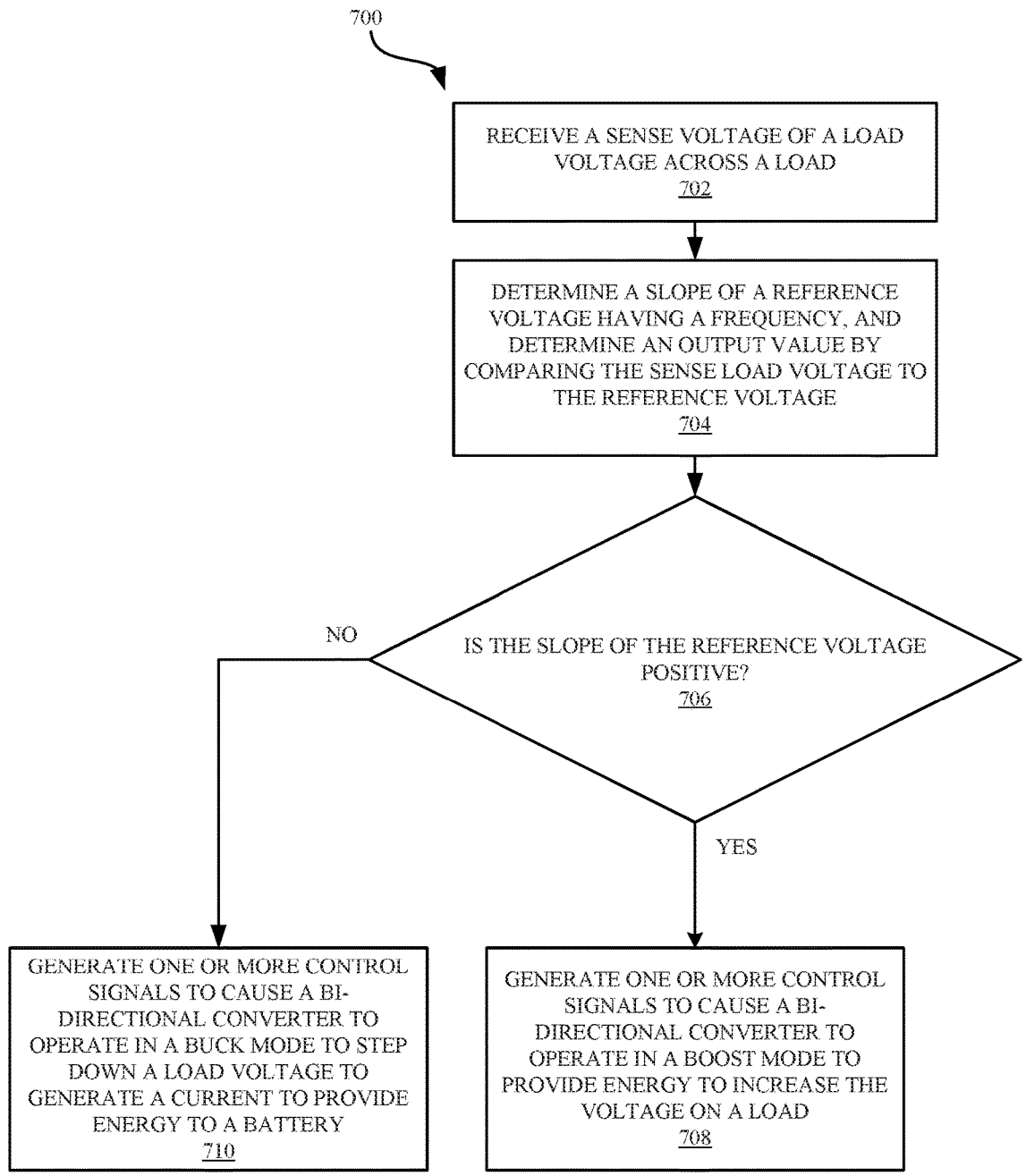
FIG. 7 illustrates a flowchart for operating the bi-directional converter, in accordance with some embodiments.

FIG. 7 illustrates exemplary logic 700 for operating a bi-directional converter 110 in boost mode 281 and buck mode 282, in accordance with some embodiments. As shown in FIG. 7, the method 700 begins at step 702, where a comparator 253 receives a fractional load voltage.

At step 704, the comparator 253 (1) determines a slope of the reference voltage, and (2) determines an output value by comparing the fractional load voltage to the reference voltage.

At step 706, the comparator 253 determines whether (1) the slope of the reference voltage is positive, and (2) whether the output value generated by the comparator 253 corresponds to a select output value in conjunction with determining whether to operate the bi-directional converter 232 in boost mode 281.

In some embodiments, the comparator 253 is configured to determine whether the slope (Δvoltage/Δtime) of the reference voltage is either positive (or slope >0) or negative (slope ≤0). The comparator 253 can be configured to generate control signals to the control logic 220 to operate the bi-directional converter 110 in boost mode 281 (step 708) when the slope of the reference voltage is positive.

Furthermore, in conjunction with the bi-directional converter 110 operating in boost mode 281, switching logic 251 can be configured to determine whether to actively switch S₁ 222 by comparing the fractional load voltage to the reference voltage. Actively switching the switch S₁ 222 provides pulses of current to the load 130 to boost the output voltage $V_{OUT}$ 218.

Alternatively, the control logic 220 can be configured to generate control signals to operate the bi-directional converter 110 in buck mode 282 (step 710) when the slope of the reference voltage is negative or zero. When the bi-directional converter 110 is operating in buck mode 282, the control logic 220 can be configured to determine whether to actively switch S₂ 224 to cause the output voltage $V_{OUT}$ 218 to track the reference voltage $V_{REF}$ 216 while the power supply 120 is provided with energy from the load 130.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A bi-directional actuator driver circuit comprising:
   a first switch;
   a second switch;
   an output node that is configured to be coupled to an actuator;
   a first input node that is configured to be coupled to a power supply;
   a second input node that is configured to provide, to a hysteresis control unit, a fractional voltage of a load voltage, wherein the hysteresis control unit is configured to: i) compare the fractional voltage to a reference voltage from a waveform generator configured to generate the shape of the waveform of the reference voltage and corresponding actuator output and ii) generate an output value based on the comparison; and
   a control logic module being configured: i) to provide a first control signal to the first switch, ii) to provide a second control signal to the second switch, and iii) to cause the bi-directional actuator driver to:
      operate in a boost mode when a slope of the reference voltage is positive and otherwise operate in a buck mode so that an output voltage at the output node corresponds to the waveform shape of the reference voltage.

2. The bi-directional actuator driver circuit of claim 1, wherein during the boost mode, the first switch is toggled via the first control signal that is actively switching and the second switch is open via the second control signal that is in an un-asserted state.

3. The bi-directional actuator driver circuit of claim 1, wherein during the buck mode, the second switch is toggled via the second control signal that is actively switching and the first switch is open via the first control signal that is in an un-asserted state.

4. The bi-directional actuator driver circuit of claim 1, wherein the hysteresis control unit configured to provide a hysteresis amount to prevent excessive switching.

5. The bi-directional actuator driver circuit of claim 1, wherein the reference voltage is a sinusoidal waveform or a trapezoidal waveform.

6. The bi-directional actuator driver circuit of claim 1, wherein the power supply is a battery.

7. The bi-directional actuator driver circuit of claim 1, wherein the reference voltage is characterized by a reference voltage frequency, and the reference voltage frequency is less than a switching frequency of the first control signal.

8. The bi-directional actuator driver circuit of claim 1, wherein the fractional voltage of the load voltage is determined by a voltage divider that is coupled to the second input node.

9. A portable electronic device comprising:
   a power supply;
   a load; and
   a bi-directional actuator driver comprising:
      a first switch,
      a second switch,
      an output node coupled to the load,
      a first input node coupled to the power supply,
      a second input node that is configured to provide, to a hysteresis control unit, a fractional voltage of a load voltage, wherein the hysteresis control unit is configured to: i) compare the fractional voltage to a reference voltage from a waveform generator configured to generate the shape of the waveform of the reference voltage and corresponding actuator output and ii) generate an output value based on the comparison, and
      a control logic module being configured: i) to provide a first control signal to the first switch, ii) to provide a second control signal to the second switch, and iii) to cause the bi-directional actuator driver to:
         operate in a boost mode when a slope of the reference voltage is positive and otherwise operate in a buck mode so that an output voltage at the output node corresponds to the waveform shape of the reference voltage.

10. The portable electronic device of claim 9, wherein during the boost mode, the first switch is toggled via the first control signal that is actively switching and the second switch is open via the second control signal that is in an un-asserted state.

11. The portable electronic device of claim 9, wherein during the buck mode, the second switch is toggled via the second control signal that is actively switching and the first switch is open via the first control signal that is in an un-asserted state.

12. The portable electronic device of claim 9, wherein the hysteresis control unit configured to provide a hysteresis amount to prevent excessive switching.

13. The portable electronic device of claim 9, wherein the reference voltage is a sinusoidal waveform or a trapezoidal waveform.

14. The portable electronic device of claim 9, wherein the power supply is a battery.

15. The portable electronic device of claim 9, wherein the reference voltage is characterized by a reference voltage frequency, and the reference voltage frequency is less than a switching frequency of the first control signal.

16. The portable electronic device of claim 9, wherein the fractional voltage of the load voltage is determined by a voltage divider that is coupled to the second input node.

17. A method for switching a bi-directional actuator driver between a boost mode and a buck mode, the method comprising:

receiving a fractional voltage of a load voltage;
comparing the fractional voltage to a reference voltage from a waveform generator configured to generate the shape of the waveform of the reference voltage and corresponding actuator output;
generating an output value based on the comparison;
determining a slope of the reference voltage;
determining an operational mode based on the slope, wherein the operational mode is a boost mode when the slope is positive and the operational mode is a buck mode otherwise;
providing a first control signal based on the output value to a first switch during the boost mode; and
providing a second control signal based on the output value to a second switch during the buck mode;
wherein the actuator driver generates an output voltage corresponding to the waveform shape of the reference voltage.

18. The method of claim 17, wherein during the boost mode, the first switch is toggled via the first control signal that is actively switching and the second switch is open via the second control signal that is in an un-asserted state.

19. The method of claim 17, wherein during the buck mode, the second switch is toggled via the second control signal that is actively switching and the first switch is open via the first control signal that is in an un-asserted state.

20. The method of claim 17, wherein the reference voltage is a sinusoidal waveform or a trapezoidal waveform.

* * * * *